United States Patent
Jia et al.

(10) Patent No.: US 8,781,218 B2
(45) Date of Patent: Jul. 15, 2014

(54) RECEPTIVE FIELD LEARNING FOR POOLED IMAGE FEATURES

(71) Applicant: NEC Laboratories America, Inc., Princeton, NJ (US)

(72) Inventors: Yangqing Jia, Berkley, CA (US); Chang Huang, Santa Clara, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 19 days.

(21) Appl. No.: 13/668,188

(22) Filed: Nov. 2, 2012

(65) Prior Publication Data

US 2013/0208977 A1   Aug. 15, 2013

Related U.S. Application Data

(60) Provisional application No. 61/554,739, filed on Nov. 2, 2011.

(51) Int. Cl.
*G06K 9/62* (2006.01)
*G06K 9/46* (2006.01)

(52) U.S. Cl.
CPC ...... *G06K 9/6256* (2013.01); *G06K 2009/4695* (2013.01)
USPC .......................................... 382/159

(58) Field of Classification Search
CPC ..... G06K 9/6256; G06K 9/66; G06K 9/6217; G06K 9/4628; G06K 9/6255; G06K 9/6262; G06N 3/04; G06N 99/005; G06N 3/08; A61B 5/7267; G06F 17/30707
USPC .......................................... 382/155, 159, 161
See application file for complete search history.

(56) References Cited

U.S. PATENT DOCUMENTS

2010/0124377 A1*   5/2010   Yu et al. .................... 382/224

OTHER PUBLICATIONS

Eastwood, Mark, "Building Well-Performing classifier Ensembles: Model and Decision level Combination", Dec. 2010, Bournemouth University, pp. 1-137.*

Hsiao et al, "Multilayered Image Processing for Multiscale Harris Corner Detection in Digital Realization", May 2010, IEEE, vol. 57, No. 5, pp. 1799-1805.*

\* cited by examiner

*Primary Examiner* — Edward Park
(74) *Attorney, Agent, or Firm* — Joseph Kolodka

(57) ABSTRACT

Systems and methods are disclosed for image classification by receiving an overcomplete set of spatial regions, jointly optimizing the classifier and the pooling region for each pooled feature; and performing incremental feature selection and retraining using a grafting process to efficiently train the classifier.

18 Claims, 2 Drawing Sheets

RECEPTIVE FIELD LEARNING FOR POOLED IMAGE FEATURES

This application claims priority to U.S. Provisional Application Ser. No. 61/554,739 filed Nov. 2, 2011, the content of which is incorporated by reference.

BACKGROUND

The present invention relates to image processing techniques.

State-of-the-art category-level image classification algorithms usually adopt a local patch based, multiple-layer pipeline to find good image features. Many methods start from local image patches using either normalized raw pixel values or hand-crafted descriptors such as SIFT or HOG, and encode them into an overcomplete representation using various algorithms such as K-means or sparse coding. After coding, global image representations are formed by spatially pooling the coded local descriptors. Such global representations are then fed into non-linear classifiers or linear classifiers, with the latter being more popular recently due to their computation efficiency. Methods following such a pipeline have achieved competitive performance on several challenging classification tasks, such as Caltech-101 and Pascal VOC.

During the last decade, much emphasis has been directed at the coding step. Dictionary learning algorithms have been discussed to find a set of basis that reconstructs local image patches or descriptors well, and several encoding methods have been proposed to map the original data to a high-dimensional space that emphasizes certain properties, such as sparsity or locality. The relationship between dictionary learning and encoding have been used to provide simple yet effective approaches that achieve competitive results. The neuroscience justification of coding comes from simple neurons in the human visual cortex, which have been believed to produce sparse and overcomplete activations.

Similarly, the idea of spatial pooling dates back to Hubel's seminal paper about complex cells in the mammalian visual cortex, which identifies mid-level image features that are invariant to small spatial shifting. The spatial invariance property also reflects the concept of locally orderless images, which suggests that low-level features are grouped spatially to provide information about the overall semantics. Most recent research on spatial pooling aims to find a good pooling operator, which could be seen as a function that produces informative statistics based on local features in a specific spatial area. For example, average and max pooling strategies have been found in various algorithms respectively, and systematic comparisons between such pooling strategies have been used to pool over multiple features in the context of deep learning.

Relatively little effort has been put into better designs or learning of better spatial regions for pooling, although it has been discussed in the context of learning local descriptors. A predominant approach to define the spatial regions for pooling, which we will also call the receptive fields (borrowing the terminology from neuroscience) for the pooled features, comes from the idea of spatial pyramids, where regular grids of increasing granularity are used to pool local features. The spatial pyramids provide a reasonable cover over the image space with scale information, and most existing classification methods either use them directly, or use slightly modified/simplified versions.

SUMMARY

In one aspect, systems and methods are disclosed for image classification by receiving an overcomplete set of spatial regions, jointly optimizing the classifier and the pooling region for each pooled feature; and performing incremental feature selection and retraining using a grafting process to efficiently train the classifier.

In another aspect, a method starts from an overcomplete set of spatial regions, and jointly optimizes the classifier and the pooling region for each pooled feature. A grafting process performs incremental feature selection and retraining. The result is better classification accuracy and a lower-dimensional feature, which helps efficiency in applications.

In another aspect, over-completeness is used to learn the optimal pooling parameters. The process starts with a large number of receptive field candidates, and train a classifier with structured sparsity to only use a sparse subset of all the features. An efficient algorithm based on incremental feature selection and retraining is used for fast learning.

Advantages may include one or more of the following. The system leverages the effect of receptive field designs on classification accuracy in the commonly adopted pipeline of image classification. The use of learning more adaptive receptive fields increases performance even with a significantly smaller codebook size at the coding layer. With this method, we achieve the best published performance on the CIFAR-10 dataset, using a much lower dimensional feature space than previous methods.

DESCRIPTION

For high performance image classification, a system is disclosed that explicitly learns the receptive fields for classification tasks. Specifically, we propose to adaptively learn such regions by considering the receptive fields additional parameters, and jointly learning these parameters with the subsequent classifiers. The resulting benefit is two-fold: receptive fields tailored to classification tasks increase the overall accuracy of classification; in addition, with the help of such mid-level features, we are able to use a much lower-dimensional feature to achieve the state-of-the-art performance. We experiment with our algorithm on the benchmark CIFAR-10 dataset and other datasets, and report a significant improvement in both accuracy and efficiency.

The Classification Pipeline

In this section, we briefly review the image classification pipeline we adopted, which leads to the problem of learning the receptive fields for spatial pooling. Specifically, we will focus on two-layer classification approaches.

Figure 1:
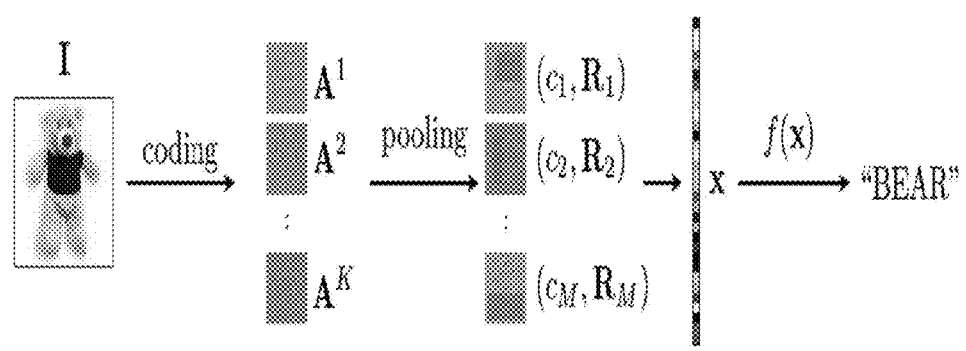
FIG. 1 shows an exemplary image classification problem.

We illustrate the pipeline from raw images to the prediction of class labels in FIG. 1. Specifically, starting with an input image I, two stages are usually adopted to generate the global feature, as we formally define below.

(1) Coding.

In the coding step, we extract local image patches, and encode each patch to K activation values based on a codebook of size K (learned via a separate dictionary learning step). These activations are typically binary (in the case of vector quantization) or continuous (in the case of e.g. sparse coding). It is generally believed that having an overcomplete (K>>the dimension of patches) codebook while keeping the activations sparse helps classification, especially when linear classifiers are used in the later steps.

Relatively simple dictionary learning and encoding approaches lead to surprisingly good performances. To learn a dictionary $D=[d_1, d_2, \ldots, d_K]$ of size K from randomly sampled patches $\{p_1, p_2, \ldots, p_N\}$ each reshaped as a vector of pixel values, two simple yet effective approaches are advocated:

1. K-means, which minimizes the squared distance between each patch and its nearest code:

$$\min_D \sum_{i=1}^{N} \min_j \|p_i - d_j\|_2^2.$$

2. OMP-M, which learns a dictionary that minimizes the reconstruction error, with the constraint that each patch is modeled by a linear combination of at most M codes:

$$\min_{D,\alpha_i} \sum_{i=1}^{N} \|p_i - D\alpha_i\|_2^2,$$

where the length of each dictionary entry $d_j$ is 1, and the cardinality of each reconstruction coefficient $\alpha_i$ is at most M.

For encoding, sparse coding can be replaced with the following efficient approaches:

1. Triangle coding], which computes the activation of code k for a patch p as $f_k(x) = \max\{0, \mu(z) - z_k\}$, where $z_k$ is the distance from p to the k-th code $d_k$, and $\mu(z)$ is the mean of distances from p to all codes.

2. Soft thresholding, which computes the inner product between p and each code, with a fixed threshold parameter $\alpha$: $f_k(x) = \max\{0, d_k^T p - \alpha\}$.

In isolating the contribution of spatial pooling from the choice of different coding methods, since local patches are usually extracted densely in a grid-based fashion, we will organize the activations of image I as a set of matrices denoted by $\{A^1(I) A^2(I), \ldots, A^K(I)\}$, one for each code in the codebook, whose element $A_{ij}^k(I)$ contains the activation of code $d_k$ for the local image patch at spatial location (i,j).

(2) Pooling.

Since the coding result are highly overcomplete and highly redundant, the pooling layer aggregates the activations over certain spatial regions of the image to obtain an M dimensional vector x as the global representation of the image. Each dimension of the pooled feature $x_i$ is obtained by taking the activations of one code in a specific spatial region (shown as the red rectangular in FIG. 1), and performing a predefined operator (usually average or max) on the set of activations.

Given an operator op that maps a set of real values to a single real value (e.g. by taking their average), a pooled feature $x_i$ can be defined based on the selection of a code indexed by $c_i$ and a spatial region denoted by $R_i$:

$$x_i = op(A_{R_i}^{c_i}) \quad (1)$$

Borrowing the definition from neuroscience, we call $R_i$ the receptive field for the pooled feature, which could be seen as a binary mask over the image. $A_{R_i}^{c_i}$ is then the set of activations of code $c_i$ in the receptive field $R_i$.

This definition provides a general definition that embraces existing pooling algorithms. For example, commonly used operators involve computing the statistics of the activations under the p-norm:

$$x_i = \frac{1}{|R_i|} \left( \sum_{\alpha_i \in A_{R_i}^{c_i}} \alpha_i^p \right)^{\frac{1}{p}} \quad (2)$$

when p=1 this corresponds to the average pooling, and when $p \to \infty$ this corresponds to the max pooling.

The definition of receptive fields for pooling is discussed next. The simplest form of pooling takes the whole image as the receptive field, thus assuming a bag-of-words model where spatial information is ignored. The more commonly adopted spatial pooling approach pools features from multiple levels of regular grids, thus defining a pyramid of pooled features. Given a set of K codes and a set of N receptive fields, the pooled features are then defined by taking the Cartesian product of the codes and the receptive fields, yielding a KN-dimenisonal global feature.

Finally, a classifier, usually linear SVM or logistic regression, is trained using the global feature vector to predict the final label of the image as $y = f(x; \theta)$.

Receptive Field Learning for Pooled Features

One embodiment learns the pooled features adaptively. Specifically, learning a set of M pooled features is equivalent to learning the parameters $C=\{c_1, c_2, \ldots, c_m\}$ and $R=\{R_1, R_2, \ldots, R_M\}$. To this end, we note that the pooled features are directly fed into the final classifier, and propose to jointly learn the classifier parameters $\theta$ together with the pooling parameters. Thus, given a set of training data $X = \{(I_n, y_n)\}_{n=1}^{N}$, the joint learning leads to solving the following optimization problem:

$$\min_{C,R,\theta} \frac{1}{N} \sum_{n=1}^{N} L(f(x_n; \theta), y_n) + \lambda Reg(\theta) \quad (3)$$

$$where x_{ni} = op(A_{n,R_i}^{c_i})$$

where we assume that the coding from $I_n$ to $\{A_n^{c_i}\}_{i=1}^{K}$ is done in an unsupervised fashion, as has been suggested by several papers such as [6]. We call this method receptive field learning, as the receptive fields are learned in such a way that information most relevant to the classification task will be extracted.

Figure 2A:
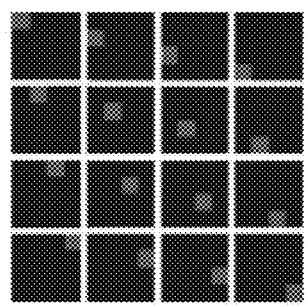
FIG. 2A-2C shows exemplary overcomplete rectangular bins based on a 4×4 superpixel setting.
Figure 2B:
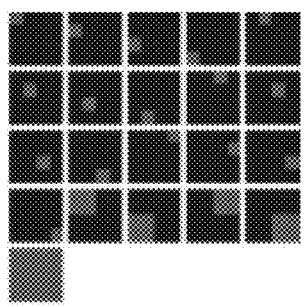
Figure 2C:
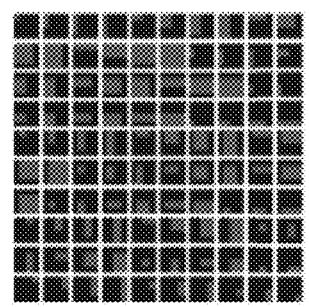

One practical issue is that solving the optimization problem (3) may be impractical, as there is an exponential number of receptive field candidates, leading to a combinatorial problem. Numerical solutions are also difficult, as the gradient with respect to the pooling parameters is not well-defined. Thus, instead of searching in the space of all possible receptive fields, we adopt the idea of over-completeness in the sparse coding community. Specifically, we start from a set of reasonably overcomplete set of potential receptive fields, and then find a sparse subset of such pooled features. The overcompleteness enables us to maintain performance, while the sparsity allows us to still carry out classification efficiently during testing time. FIG. 2A-2C shows exemplary overcomplete rectangular bins based on a 4×4 superpixel setting: FIG. 2A shows superpixels; FIG. 2B shows spatial pyramid bins; and FIG. 2C shows overcomplete rectangular bins.

3.1 Overcomplete Receptive Fields

The exponential number of possible receptive fields arises when we consider the inclusion and exclusion of single pixels individually. In practice this is often unnecessary, as we expect the active pixels in a receptive field to be spatially contiguous. In this paper, we use receptive fields consisting of rectangular regions: this provides us a reasonable level of over-completeness, as there are $O(n^4)$ different rectangular receptive fields for an image containing n×n pixels. In addition, since the motivation of spatial pooling is to provide tolerance to small spatial displacements, we build the rectangular regions upon superpixels, which are defined as dense regular grids on the image. FIG. 1 shows an example of such rectangular receptive fields compared with regions defined by the spatial pyramid on a 4×4 grid.

Given the set of P overcomplete regions, which we denote by $R=\{R_1, R_2, \ldots, R_P\}$, and the dictionary $D=\{d_1, d_2, \ldots, d_K\}$ of size K, we can define a set of PK potential pooled features based the Cartesian product R×D. Specifically, the i-th receptive field and the j-th code jointly defines the (K×i+j)-th pooled feature as $x_{K \times i+j} = op(A_{R_i}^j)$. Note that when the coding and pooling are both carried out in an overcomplete fashion, the resulting pooled feature is usually very high-dimensional.

3.2 Structured Sparsity for Receptive Field Learning

While it is possible to train a linear classifier using the high-dimensional pooled feature x above, in practice it is usually beneficial to build a classifier using relatively low-dimensional features. In addition, for multiple-label classification, we want the classifiers of different labels to share features. This brings two potential advantages: feature computation could be minimized, and sharing features among different classifiers is known to provide robustness to the learned classifiers. To this end, we adopt the idea of structured sparsity, and train a multiple-class linear classifier y=f(x)=Wx+b via the following optimization problem:

$$\min_{W,b} \frac{1}{N} \sum_{n=1}^{N} l(W^T x_n + b, y_n) + \frac{\lambda_1}{1} \|W\|_{Fro}^2 + \lambda_2 \|W\|_{1,\infty} \quad (4)$$

where $y_i$ is the L-dimensional label vector coded in a 1-of-L fashion, with values taken from $\{-1,+1\}$ given L classes. $x_i$ is an M-dimensional feature vector defined by overcomplete pooling in the previous subsection, and $W=[w_1, w_2, \ldots, w_L]$ is a M×L weight matrix containing the weight vector for the L classifiers.

Two regularization terms are adopted in the optimization. The squared Frobenius norm $\|W\|_{Fro}^2$ aims to minimize the structured loss in the classical SVM fashion, and the second regularizer is the $L_{1,\infty}$ norm of the matrix W:

$$\|W\|_{1,\infty} \sum_{i=1}^{M} \|W_{i,\cdot}\|_{\infty} = \sum_{i=1}^{M} \max_{j \in \{1,\ldots,L\}} |W_{ij}| \quad (5)$$

where $W_{i,\cdot}$ denotes the i-th row of the matrix W. This regularizer introduces structured sparsity by encouraging the weight matrix W to be row-wise sparse, so that the classifiers for different classes tend to agree on whether to use a specific feature, and when combined together, only jointly use a subset of the overcomplete pooled features. The addition of the $L_{1,\infty}$ norm also provides a elastic-net like regularization, which is known to perform well when the dimension of data is much higher than the number of data points.

For optimization considerations, we use the multi-class extension of the binomial negative log likelihood (BNLL) loss function [25]:

$$l(W^T x + b, y) = \sum_{i=1}^{L} \ln(1 + e^{-y_i(W_{\cdot,i}^T x + b_i)}) \quad (6)$$

The choice of the BNLL loss function over the hinge loss is mainly for computational simplicity, as the gradient is easier to compute for any input. In practice, the performance does not change much if we use the hinge loss instead.

3.3 Fast Approximate Learning by Feature Selection

Jointly optimizing is still a computationally challenging task despite its convexity, due to the over-completeness in both coding and pooling. While it is possible to carry out the computation on smaller-scale problems like Caltech-101, we adopt a greedy approach to train the model for larger-scale problems. Inspired by the matching pursuit algorithm in dictionary training and the grafting algorithm in machine learning, we start with an empty set of selected features, incrementally add features to the set, and retrain the model when new features are added.

Mathematically, we maintain a set S recording the set of currently selected features. At each iteration, for each feature index j that has not been not selected, we compute the score of the feature as the 2-norm of the gradient of the objective function, denoted by L(W,b), with respect to the corresponding weight vectors:

$$\text{score}(j) = \left\| \frac{\partial L(W,b)}{\partial W_{j,\cdot}} \right\|_{Fro}^2 \quad (7)$$

We then select the feature with the largest score, and add it to the selected set S. The model is retrained using the previously learned optimum solution as the starting point. From a boosting perspective, this can be considered as incrementally learning weak classifiers, but our method differs from boosting in the sense that the weights for already selected features are also updated when new features are selected.

As the speed of retraining drops when more features are added, we adopt an approximate retraining strategy: for each iteration t, we select an active subset $S_A$ of S based on the score above. We then retrain the model with respect to the active set and the bias term only:

$$W_{S_A,\cdot}^{(t+1)}, b = \operatorname{argmin}_{W_{S_A,\cdot}, b} L(W, b) \quad (8)$$

with the constraint that $W_{\bar{S}_A,\cdot}$ keep unchanged. The intuition is that with an already trained classifier from the previous iteration, adding one dimension will only introduce small changes to the existing weights.

We found the performance of this approximate algorithm with the active set size less than 100 to be very close to the full retraining algorithm with a significant increase in computation speed. The performance usually stabilizes with a significantly smaller number of features, showing the effectiveness of introducing structured sparsity into classifier learning.

Figure 3:
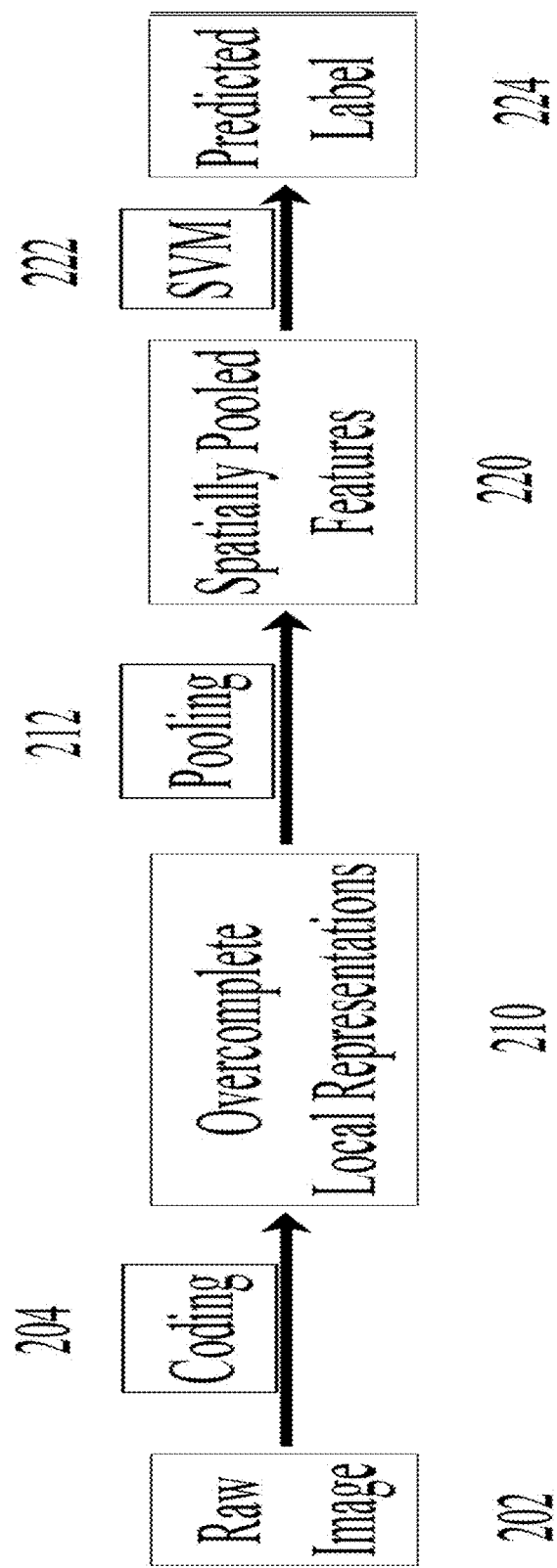
FIG. 3 shows an exemplary image classification pipeline.

FIG. 3 shows an exemplary image classifier. Operation 204 (usually called coding) extract local image patches and convert them to a set of overcomplete representation. Then operation 212 (usually called pooling) computes the statistics of such local representations over predefined spatial regions. The classifier then collects these statistics to perform the final image classification task.

Raw images (202) is provided to a coding process (204) to generate overcomplete local representations of the images (210). The data is presented to the pooling operation (212) which generates spatially pooled features (220). These features are then supplied to a support vector machine (SVM) 222 to generate predicted labels. The SVM is a supervised learning model with associated learning algorithms that analyze data and recognize patterns, used for classification and regression analysis. The basic SVM takes a set of input data and predicts, for each given input, which of two possible classes forms the output, making it a non-probabilistic binary linear classifier. Given a set of training examples, each marked as belonging to one of two categories, an SVM training algorithm builds a model that assigns new examples into one category or the other. An SVM model is a representation of the examples as points in space, mapped so that the examples of the separate categories are divided by a clear gap that is as wide as possible. New examples are then mapped into that same space and predicted to belong to a category based on which side of the gap they fall on.

In the pooling operation of the processing pipeline, instead of predefining the pooling spatial regions, the process starts from an overcomplete set of spatial regions, and jointly optimizes the classifier and the pooling region for each pooled feature. In one embodiment, a grafting algorithm performs incremental feature selection and retraining. The result is better classification accuracy and a lower-dimensional feature, which helps efficiency in applications.

The system exploits the effect of receptive field designs on the classification accuracy in the commonly adopted pipeline of image classification. While existing algorithms use manually defined spatial regions for pooling, learning more adaptive receptive fields increases performance even with a significantly smaller codebook size at the coding layer. The classifer also apply over-completeness and structured sparsity, and efficiently performs feature selection from a set of pooling candidates. With this method, one embodiment achieved the best published performance on the CIFAR-10 dataset, using a much lower dimensional feature space than previous methods. The classifier can also use more flexible definition of pooling receptive fields, and unsupervised learning of such pooled features.

The invention claimed is:

1. An image classification method, comprising:
receiving an overcomplete set of spatial regions;
jointly optimizing the classifier and the pooling region for each pooled feature;
performing incremental feature selection and retraining using a grafting process to efficiently train the classifier, and
training a multiple-class linear classifier $y=f(x)=Wx+b$ with an optimization problem:

$$\min_{W,b} \frac{1}{N} \sum_{n=1}^{N} l(W^T x_n + b, y_n) + \frac{\lambda_1}{1} \|W\|_{Fro}^2 + \lambda_2 \|W\|_{1,\infty}$$

where $Y_i$ is the L-dimensional label vector coded in a 1-of-L fashion, with values taken from $\{-1,+1\}$ given L classes $x_i$ is an M-dimensional feature vector defined by overcomplete pooling in the previous subsection, and $W=[w_1, w_2, \ldots, w_L]$ is a M×L weight matrix containing the weight vector for the L classifiers.

2. The method of claim 1, comprising extracting local image patches and converting the images to a set of overcomplete representation (coding).

3. The method of claim 1, comprising determining statistics of local representations over predefined spatial regions (pooling).

4. The method of claim 1, comprising collecting statistics to perform a final image classification task.

5. The method of claim 1, comprising optimizing with a multi-class extension of the binomial negative log likelihood (BNLL) loss function:

$$l(W^T x + b, y) = \sum_{i=1}^{L} \ln(1 + e^{-y_i(w_{\cdot,i}^T x + b_i)}).$$

6. The method of claim 1, comprising performing fast approximate learning.

7. The method of claim 6, for each feature index j, comprising determining a score of a feature as a 2-norm of a gradient of an objective function, denoted by L(W,b), with respect to weight vectors:

$$\text{score}(j) = \left\| \frac{\partial L(W,b)}{\partial W_j} \right\|_{Fro}^2.$$

8. The method of claim 7, comprising approximately retraining a model on selected subset.

9. The method of claim 1, comprising performing local patch based, multiple-layer pipelinng to find predetermined image features for a task.

10. An image classification system, comprising:
means for rereceiving an overcomplete set of spatial regions, and means for jointly optimizing the classifier and the pooling region for each pooled feature;
means for performing incremental feature selection and retraining using a grafting processto efficiently train the classifier, and
means for training a multiple-class linear classifier $y=f(x)=Wx+b$ with an optimization problem:

$$\min_{W,b} \frac{1}{N} \sum_{n=1}^{N} l(W^T x_n + b, y_n) + \frac{\lambda_1}{1} \|W\|_{Fro}^2 + \lambda_2 \|W\|_{1,\infty}$$

where $Y_i$ is the L-dimensional label vector coded in a 1-of-L fashion with values taken from $\{-1,+1\}$ given L classes, $X_i$ is an M-dimensional feature vector defined by overcomplete pooling in the previous subsection, and $W=[w_1, w_2, \ldots, w_L]$ is a M×L weight matrix containing the weight vector for the L classifiers.

11. The system of claim 10, comprising means for determining statistics of local representations over predefined spatial regions (pooling).

12. The system of claim 10, comprising means for collecting statistics to perform a final image classification task.

13. The system of claim 10, comprising means for optimizing with a multi-class extension of the binomial negative log likelihood (BNLL) loss function:

$$l(W^T x + b, y) = \sum_{i=1}^{L} \ln(1 + e^{-y_i(w_{:,i}^T x + b_i)}).$$

14. The system of claim 10, comprising means for performing fast approximate learning.

15. The system of claim 14, for each feature index j, comprising determining a score of a feature as a 2-norm of a gradient of an objective function, denoted by L(W,b) with respect to weight vectors:

$$\text{score}(j) = \left\| \frac{\partial L(W, b)}{\partial W_j} \right\|_{Fro}^2.$$

16. The system of claim 15, comprising approximately retraining model on selected subset.

17. The system of claim 10, comprising a local patch based, multiple-layer pipeline to find predetermined image features for a task.

18. An image classification method, comprising:

receiving an overcomplete set of spatial regions;

jointly optimizing the classifier and the pooling region for each pooled feature;

performing incremental feature selection and retraining using a grafting process to efficiently train the classifier; and performing fast approximate learning;

wherein for each feature index j, comprising determining a score of a feature as a 2-norm of a gradient of an objective function, denoted by L(W,b), with respect to weight vectors:

$$\text{score}(j) = \left\| \frac{\partial L(W, b)}{\partial W_j} \right\|_{Fro}^2.$$

* * * * *